(12) United States Patent
Mork et al.

(10) Patent No.: US 11,049,066 B2
(45) Date of Patent: Jun. 29, 2021

(54) PROPAGATING ADJUSTMENTS ACROSS CHANNELS OF MULTI-DIMENSIONAL DATA

(71) Applicant: ORACLE INTERNATIONAL CORPORATION, Redowood Shores, CA (US)

(72) Inventors: James Mork, Del Mar, CA (US); Justine Shiou, Aurora, IL (US); Lisa Smith, Woodbury, MN (US)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 16/146,111

(22) Filed: Sep. 28, 2018

(65) Prior Publication Data

US 2020/0104786 A1 Apr. 2, 2020

(51) Int. Cl.
*G06Q 10/08* (2012.01)
*G06Q 20/32* (2012.01)

(52) U.S. Cl.
CPC ........... *G06Q 10/087* (2013.01); *G06Q 20/32* (2013.01)

(58) Field of Classification Search
CPC ...... G06Q 10/087; G06Q 10/06; G06Q 30/06; G06Q 10/08; G06Q 10/0838; G06Q 10/0631; G06Q 40/12; G06Q 10/0837; G06Q 30/02; G06Q 30/0251; G06Q 30/0255; G06Q 30/0269; G06Q 20/32; G06Q 30/0241; G06Q 30/0244; G06Q 30/0258; G06Q 30/0271; G06Q 30/0273; G06Q 30/0274; G06Q 30/0277; G06Q 40/04
See application file for complete search history.

(56) References Cited

U.S. PATENT DOCUMENTS

| | | | | |
|---|---|---|---|---|
| 7,234,609 | B2 * | 6/2007 | DeLazzer | G07F 7/069 221/10 |
| 8,019,659 | B2 * | 9/2011 | Musgrove | G06F 16/2246 705/27.1 |
| 9,626,646 | B1 * | 4/2017 | Ettl | G06Q 10/087 |
| 2002/0143668 | A1 * | 10/2002 | Goodwin, III | G06Q 10/087 705/28 |
| 2004/0084527 | A1 * | 5/2004 | Bong | G06Q 10/087 235/385 |
| 2005/0086127 | A1 * | 4/2005 | Hastings | G06Q 10/00 705/307 |

(Continued)

OTHER PUBLICATIONS

Anonymous; "Merchandise Planning Software for OmniChannel Retail"; downloaded on Apr. 4, 2018; https://www.txtretail.com/solutions/merchandise-financial-planning/.

(Continued)

*Primary Examiner* — Peter Ludwig
(74) *Attorney, Agent, or Firm* — Potomac Law Group, PLLC

(57) ABSTRACT

Systems and methods are provided for propagating adjustment across channels of multi-dimensional data. Multi-dimensional data can be stored in a database, the multi-dimensional data including at least a channel dimension with a plurality of channel members and a product dimension with a plurality of product members. Return input including a first number and fulfilment input including a second number can be received about a first product member. A display can be dynamically generated for one or more cross-sections of data between the first product member and multiple of the channel members, wherein the first number and second number are propagated to intersections of the first product member and the multiple channel members by dynamically adjusting inventory data or sales data based on the first number and the second number.

20 Claims, 11 Drawing Sheets

(56) References Cited

U.S. PATENT DOCUMENTS

| | | | | |
|---|---|---|---|---|
| 2005/0171912 | A1* | 8/2005 | Fenelon | G06Q 10/06 705/50 |
| 2008/0010173 | A1* | 1/2008 | Rendich | G06Q 10/02 705/28 |
| 2009/0089187 | A1* | 4/2009 | Hoersten | G06Q 10/087 705/28 |
| 2012/0059509 | A1* | 3/2012 | Kuehnrich | G07F 7/069 700/225 |
| 2012/0290423 | A1* | 11/2012 | Hoersten | G06Q 30/0645 705/22 |
| 2014/0089147 | A1* | 3/2014 | Herndon | G06Q 30/0635 705/28 |
| 2017/0255900 | A1* | 9/2017 | High | G06Q 50/28 |
| 2017/0330211 | A1* | 11/2017 | Deshpande | G06Q 30/0206 |
| 2018/0005171 | A1* | 1/2018 | Harsha | G06Q 10/087 |

OTHER PUBLICATIONS

H. Kourimsky et al.; "The Impact of Omni-Channel Commerce on Supply Chains"; itelligence White Paper; downloaded on Apr. 4, 2018; https://www.hybris.com/medias/sys_master/root/hb5/hb2/8809522659358/WhitePaper-ImpactOfOmnichannel-WEB-20141017-GLO-EN.pdf?campaigncode=undefined.

J Cascone et al.; "Achieving Assurance of Supply in an Omni-channel World" Deloitte & Touche LLP; 2015; Downloaded on Apr. 4, 2018; https://www2.deloitte.com/content/dam/Deloitte/global/Documents/Consumer-Business/gx-cb-supply-chain-omnichannel-020315.pdf.

M. Bernon et al.; "Online retail returns management: Integration within an omni-channel distribution context"; Intrnational Journal of Physical Distribution & Logistics Management; vol. 46, Issue 6/7; downloaded on Apr. 4, 2018; https://www.emeraldinsight.com/doi/abs/10.1108/IJPDLM-01-2015-0010?mobileUi=0&journalCode=ijpdlm.

SPS Commerce Blog Team; Just-In-Time (JIT) inventory management for retailers; Jun. 28, 2017; https://www.spscommerce.com/au/blog/just-i-time-jit-inventory-management-spsg/.

T. Gunston; "Oracle® Retail Merchandise Financial Planning Retail"; User Guide for the RPAS Classic Client; Release 16.0; E72937-01; Dec. 2016.

* cited by examiner

PROPAGATING ADJUSTMENTS ACROSS CHANNELS OF MULTI-DIMENSIONAL DATA

FIELD

The embodiments of the present disclosure generally relate to propagating adjustments across channels of multi-dimensional data.

BACKGROUND

Data planning, analytics, and processing for entities and/or scenarios have generated tangible benefits for organizations. For example, enhancements in planning can lead to improved supply and/or logistic efficiencies and can result in better use of resources. Achieving such data planning, analytics, and processing can be challenging, particularly when entities include a large number of different departments and sub-departments with numerous dependencies among them. Such circumstances call for sophisticated data storage and modeling, retrieval, analytics, and display techniques to achieve the desired planning results. For instance, complex multi-dimensional data models can include an unquantifiable number of potential intersections of data, and the resultant software that manages this data must solve a multi-faceted data challenge. When changes to a business environment call for new software capabilities, the resultant upgrades to the sophisticated data storage and modeling, retrieval, analytics, and/or display techniques can be especially challenging to achieve.

SUMMARY

The embodiments of the present disclosure are generally directed to systems and methods for to propagating adjustments across channels of multi-dimensional data that substantially improve upon the related art.

Systems and methods are provided for propagating adjustment across channels of multi-dimensional data. Multi-dimensional data can be stored in a database, the multi-dimensional data including at least a channel dimension with a plurality of channel members and a product dimension with a plurality of product members. Return input can be received about a first product member, the return input comprising a first number of products purchased using a first channel member and returned using a second channel member. Fulfilment input can be received about the first product member, the fulfilment input comprising a second number of products bought using one of the plurality of channel members and fulfilled using a different one of the plurality of channel members. One or more displays can be dynamically generated for one or more cross-sections of data between the first product member and multiple of the plurality of the channel members, wherein the first number and second number are propagated to one or more intersections of the first product member and the multiple of the plurality of channel members by dynamically adjusting one or more of inventory data or sales data based on the first number and the second number.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

Figure 5A:
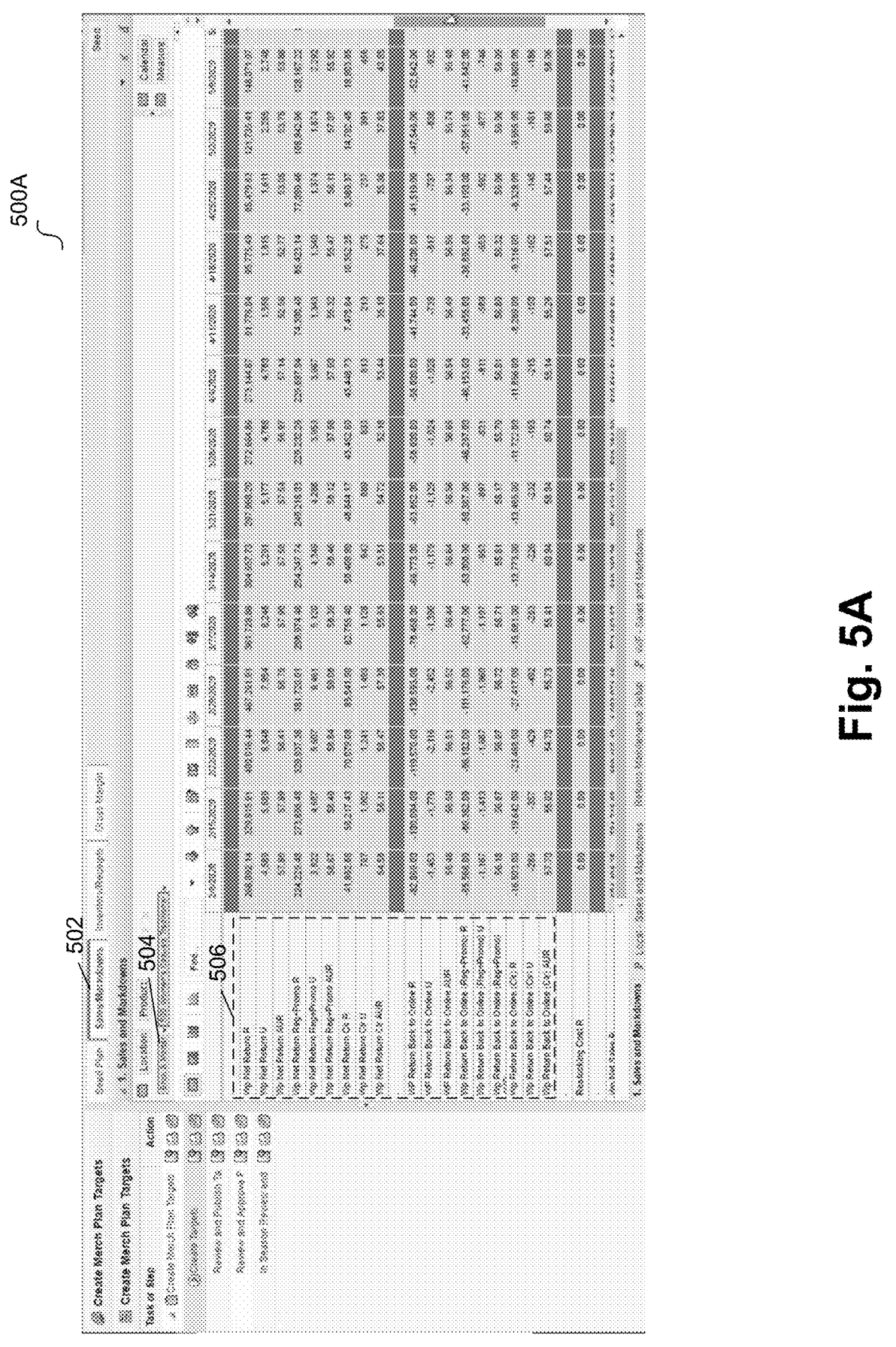
Figure 5C:
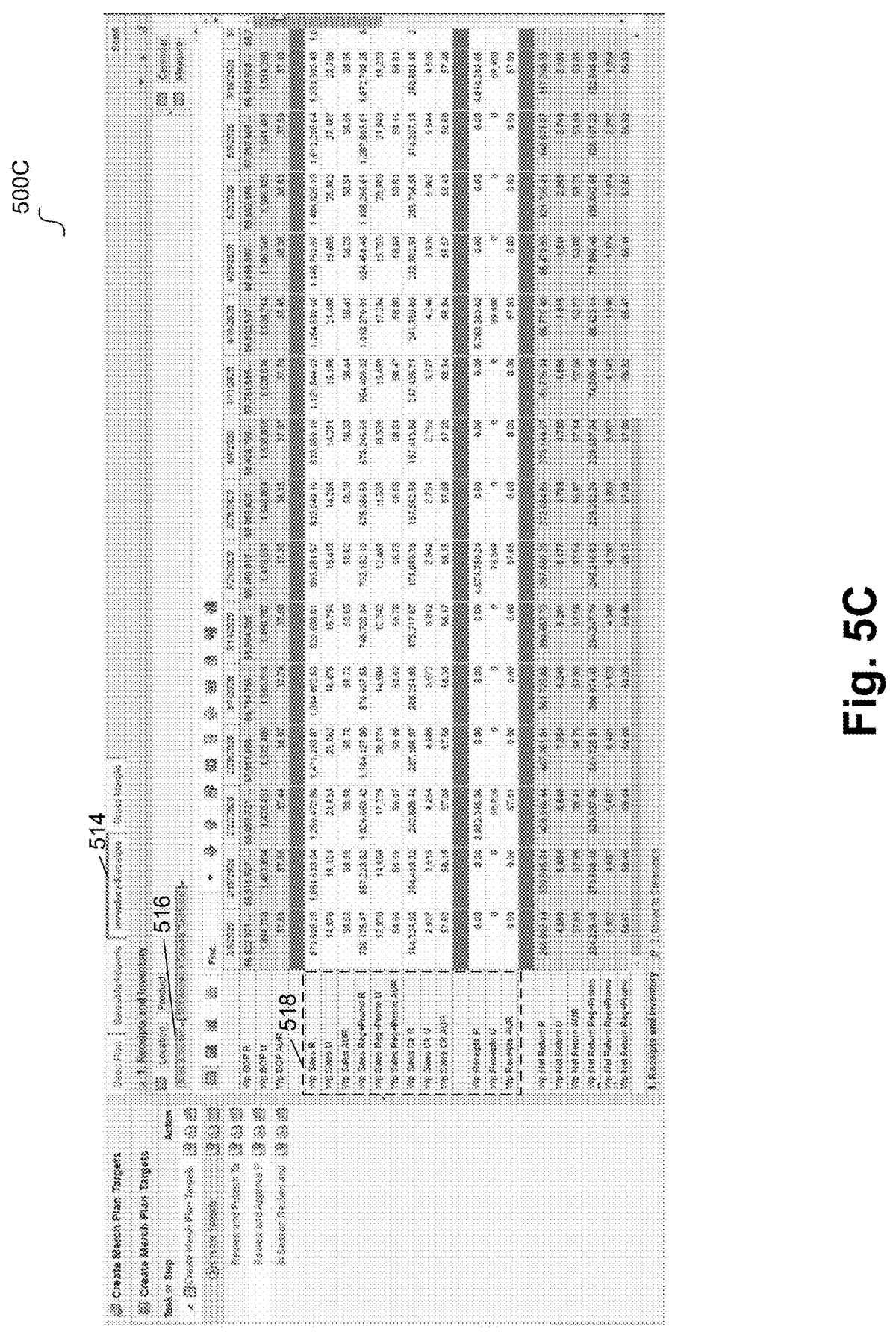

FIGS. 5A, 5B, and 5C illustrate user interfaces for configuring and displaying multi-dimensional data cross-sections over a plurality of channels according to an example embodiment.

DETAILED DESCRIPTION

Figure 1A:
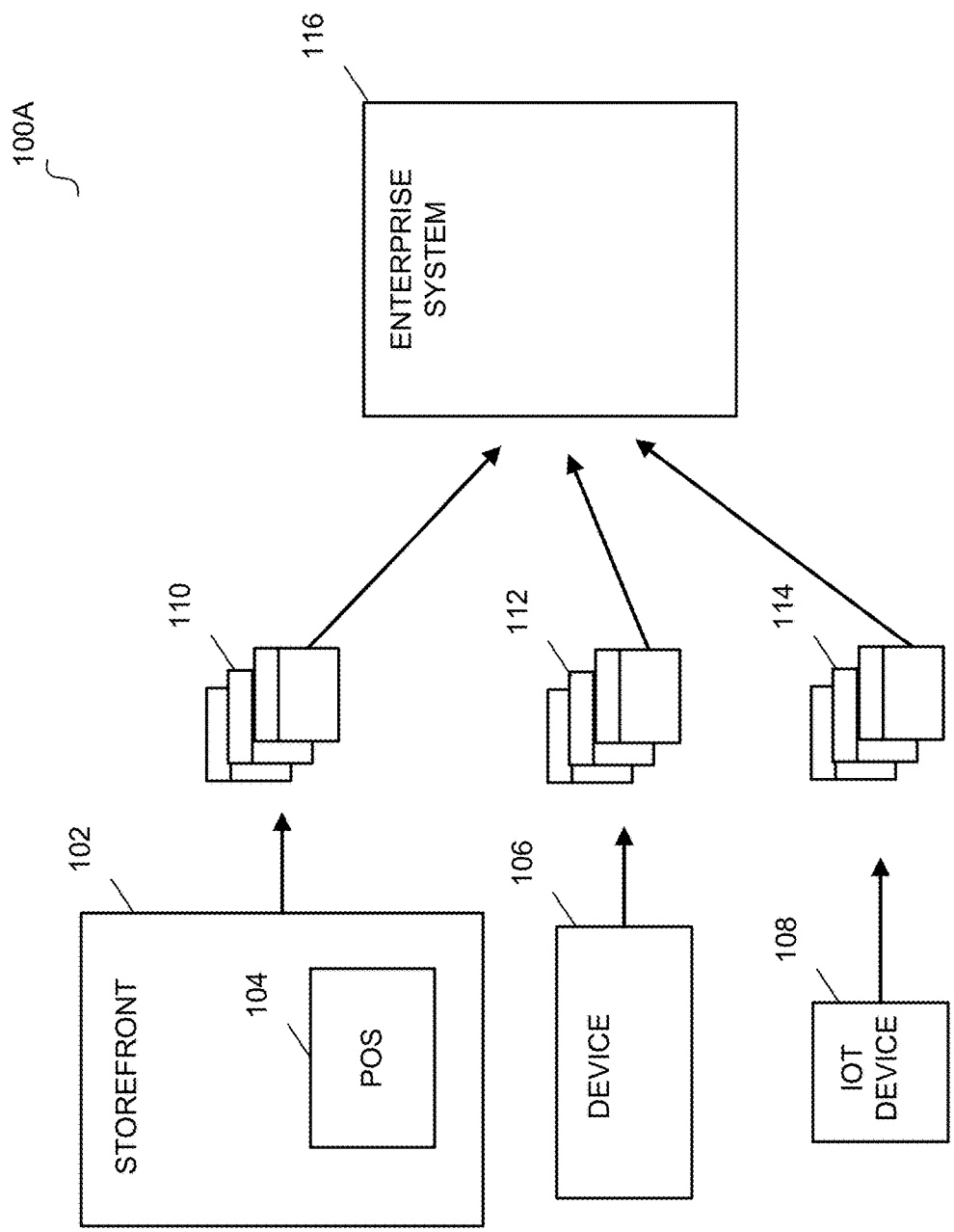
FIGS. 1A and 1B illustrate systems for processing transactions using different channels according to an example embodiment.

Embodiments propagate adjustments across channels of multi-dimensional data. In some embodiments, the adjustments can relate to products and the channels can include various channels for performing product transactions and fulfilling product orders. For example, a customer can purchase a product using an in-store channel, and the purchase can be fulfilled using a direct to consumer (e.g., ship to customer) channel. Other examples include purchase using direct to consumer (e.g., over the Internet) and pick up in-store, purchase using direct to consumer (e.g., over the Internet) and return in-store, purchase in-store and direct return (e.g., by mail), and the like.

In some embodiments, software (e.g., planning software and/or inventory system software) can propagate adjustments across the channels of the multi-dimensional data to configure the enterprise data (e.g., plan data and/or inventory data) according to realistic consumer behavior. For example, inventory levels, sales data, and the like can be adjusted to reflect the unique circumstances for product transactions, fulfilments, and returns.

In some embodiments, planning software, such as Oracle® Retail Merchandise Financial Planning, can include a multi-dimensional data model for planning over enterprise data. For example, the multi-dimensional data model can include a channel dimension with channel members, such as direct to consumer, in-store, Internet of Things ("IoT"), catalog, third party, and the like. Other dimensions can include products, plans, calendar, measures (e.g., inventory, sales, and the like), and any other suitable dimensions, as well as corresponding members within these dimensions.

When purchases, fulfilment of purchases, and returns use a different mix of channels as described above, the multi-dimensional data can be impacted in several ways, particularly with regard to different cross-sections of the multi-dimensional data. For example, inventory levels, sales data, and other planning data can be incorrect if adjustments that compensate for the mixed channel purchases, fulfilments, and/or returns are not applied to the enterprise data. In some embodiments, adjustments can be propagated to different levels of the multi-dimensional data that compensate for the underlying enterprise data changes caused by the mixed channel usage. After adjustments, the enterprise data more accurately reflects the circumstances for customer transactions with the enterprise, allowing for improved planning by the planning software.

In some embodiments, shipments can be performed according to adjusted enterprise data. For example, based on certain adjustments to inventory levels, shipments can be executed between a warehouse and a store. When the mixed channel adjustments are executed to enterprise inventory data, the adjusted inventory may more accurately reflect real-world scenarios, and thus supply shipments can be executed in a manner that improves resource utilization.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1B:
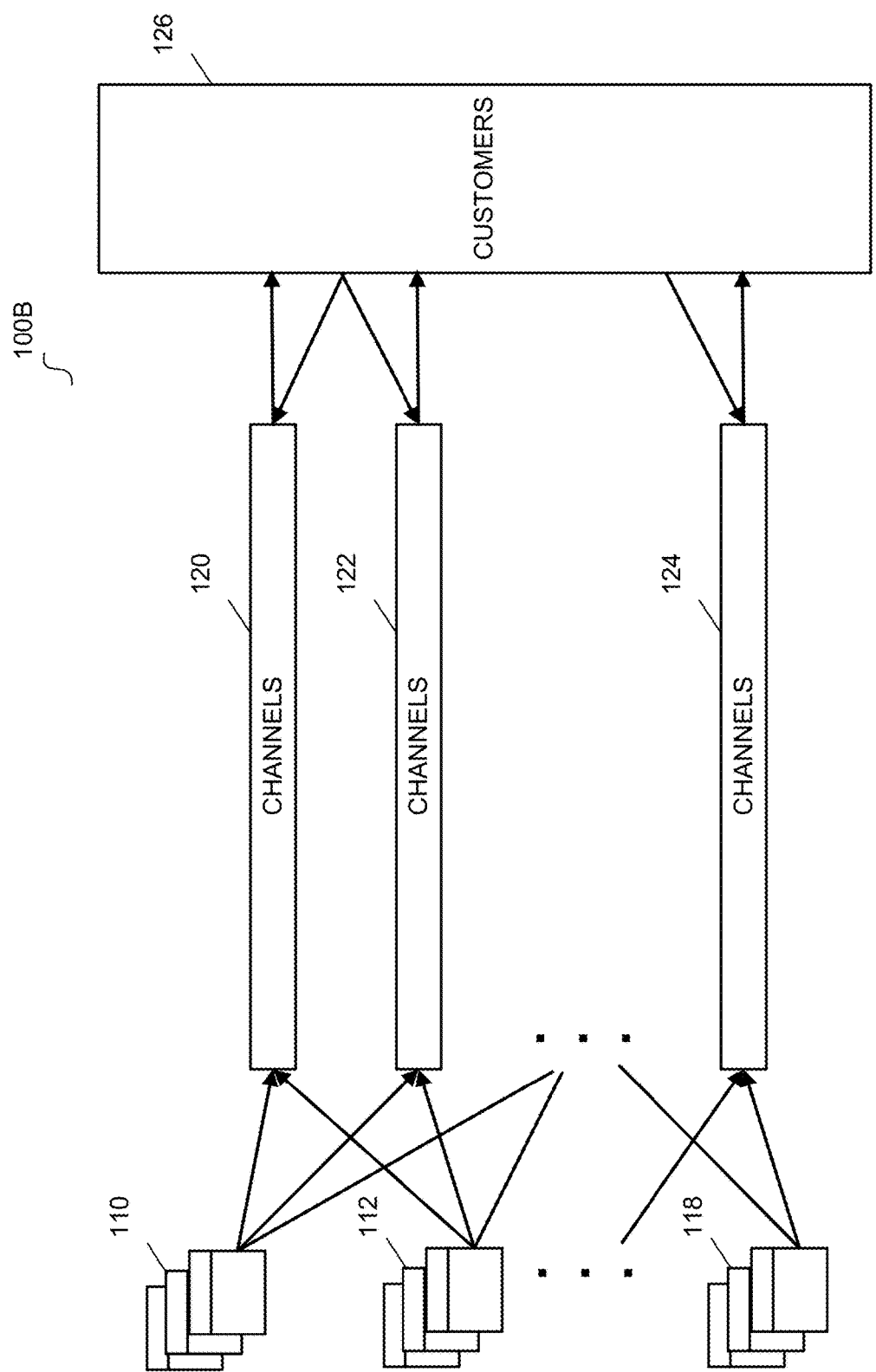

FIGS. 1A and 1B illustrate systems for processing transactions using different channels according to an example embodiment. Systems 100A and 100B comprise a storefront 102, a point of sales device 104, a computing device 106, an IoT device 108, transactions 110, 112, 114, and 118, enterprise system 116, channels 120, 122, and 124, and customers 126. In some embodiments, transactions 110, 112, 114, and 118 can represent customer transactions with an enterprise business.

An example enterprise business can be a corporation (e.g., large multi-national corporation) with one or more retail locations that offer products for sale to customers 126. For example, storefront 102 can represent a retail store location for the enterprise business. In some embodiments, a customer at storefront 102 can transact with the enterprise business (e.g., purchase products, initiate returns, select fulfilment channels, and the like), for example by interacting with a customer service representative using point of sales device 104 (or interacting directly with point of sales device 104). Transactions 110 can represent transactions (e.g., purchases, returns, exchanges, and the like) with customers at storefront 102 (e.g., using point of sales device 104).

In some embodiments, the enterprise business can also sell to customers through other channels, such as using an online website, an "app" (e.g., local, mobile, or web application), using other e-commerce techniques, through a third party, and using any other suitable channel. For example, a customer can use computing device 106 and/or IoT device 108 to interface with an online presence of an enterprise business (e.g., website) to transact with the business (e.g., purchase products, initiate returns, select fulfilment channels, and the like). Transactions 112 and 114 can represent transactions with customers (e.g., purchases, returns, exchanges, and the like) using computing device 106 and IoT device 108, respectively.

Enterprise system 116 can store transactions 110, 112, and 114 and populate a database with enterprise data corresponding to the transactions. For example, point of sales device 104 can communicate with a computing device or server of enterprise system 116 to communicate transactions 110 to the system such that the transactions can be stored in a database. In another example, a computing device or server that hosts the online presence (e.g., website) for the enterprise can store transactions 112 and 114 in a database. The enterprise data can include sales data, inventory data, and the like.

System 1008 depicts multiple channels 120, 122, and 124 for transactions 110, 112, and 118. In embodiments, transactions can be generated in any suitable manner, for example, transactions 118 can be generated using any of point of sales device 104, computing device 106, IoT device 108, or using any other suitable techniques. As previously described, a transaction, such as a purchase of a product, can leverage mixed channels for different parts of the transaction. For example, a purchase can be executed in-store while fulfilment (e.g., delivery of product) can be achieved direct to the consumer (e.g., by mail).

Channels 120, 122, and 124 can each represent a channel for accomplishing a portion of a transaction (e.g., purchase, return, exchange, and the like). For example, each of channels 120, 122, and 124 may represent an in-store channel, a direct to consumer channel (e.g., over the Internet purchase/by mail fulfilment), a third-party channel, and the like. As illustrated, each of transactions 110, 112, and 118 can be associated with one or multiple of channels 120, 122, and 124. For example, transaction 110 can be associated with an in-store channel for execution of the transaction and a direct to consumer channel for fulfilment (e.g., delivery) of a product for the transaction.

In some embodiments, this transaction can be associated with a third-party channel, such as if a return of the product is executed by a third-party channel (e.g., an external business). For example, one or more locations of a third-party entity (e.g., retail locations of a separate business) may be leveraged to perform some transactions for the enterprise business, such as accept returns or fulfil product orders (e.g., delivery).

Point of sales device 104, computing device 106, and/or IoT device 108 can be any computer, laptop, mobile phone, smartphone, tablet, or any suitable electronic device that communicates using wired or wireless communication protocols (e.g., by transmitting and/or receiving wired signals using a connection port or wireless signals with an antenna or transceiver). For example, point of sales device 104, computing device 106, and/or IoT device 108 can be any electronic device that can connect to the Internet. In some embodiments, point of sales device 104 can be similar to a traditional point of sales devices (e.g., electronic cash register), a generic computing device configured to operate as a point of sales device (e.g., tablet, laptop, or computer configured with hardware/software to function as a point of sales devices), and the like. In some embodiments, point of sales device 104 includes one or more of a credit card reader, a scanner (e.g., barcode/QR code scanner), a keyboard, a display (e.g., touchscreen display), and any other suitable components.

In some embodiments, a user interface for a point of sales device 104, computing device 106, and/or IoT device 108 may include a touchscreen and/or other input/output devices. It should be understood, however, that the user interfaces and associated methods may be applied to other devices, such as personal computers, laptops, and the like which may include one or more other physical user-interface devices, such as a keyboard and or mouse, or any other suitable user-interface device.

Point of sales device 104, computing device 106, and/or IoT device 108 may support a variety of applications, such as an Internet browser, text messenger, experience management, and various other applications. The various applications that may be executed on one or more of these electronic devices may use at least one common physical user-interface device. In addition, a common physical architecture of one or more of these electronic devices may support a variety of applications with user interfaces that are intuitive and transparent.

Figure 2:
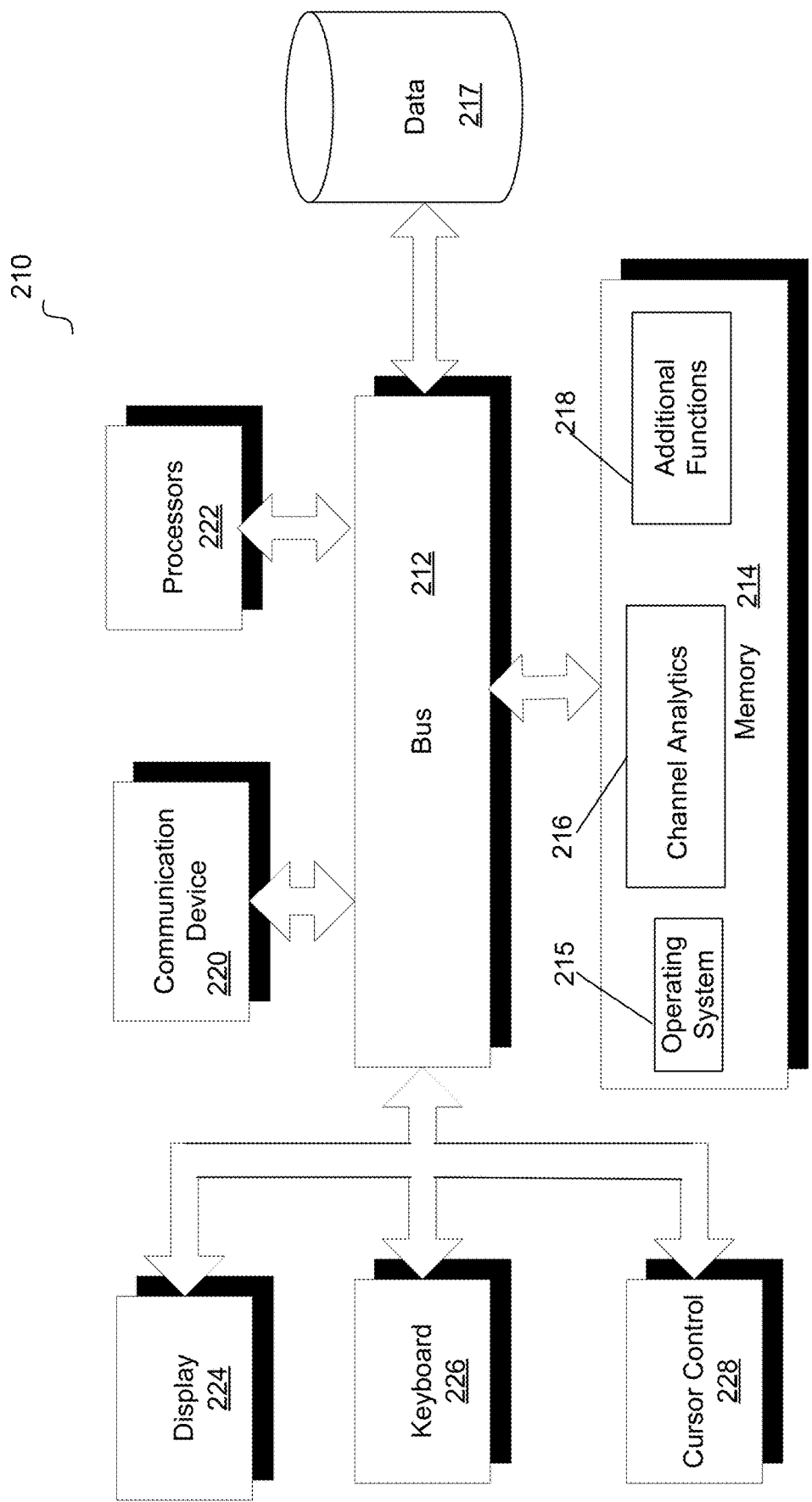
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, planning module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, planning module 216 configured to perform enterprise planning functionality, as well as other applications modules 218. Operating system 215 provides operating system functionality for system 200. In some instances, planning module 216 may be implemented as an in-memory configuration. In some implementations, when system 200 executes the functionality of planning module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include the various modules of Oracle® Cloud Infrastructure, Oracle® Cloud Platform, and/or Oracle® Cloud Applications, for example. Planning module 216, other applications module 218, and any other suitable component of system 200 can include various modules of Oracle® Retail Merchandise Financial Planning. A database 217 is coupled to bus 212 to provide centralized storage for modules 216 and 218 and to store, for example, data received planning module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
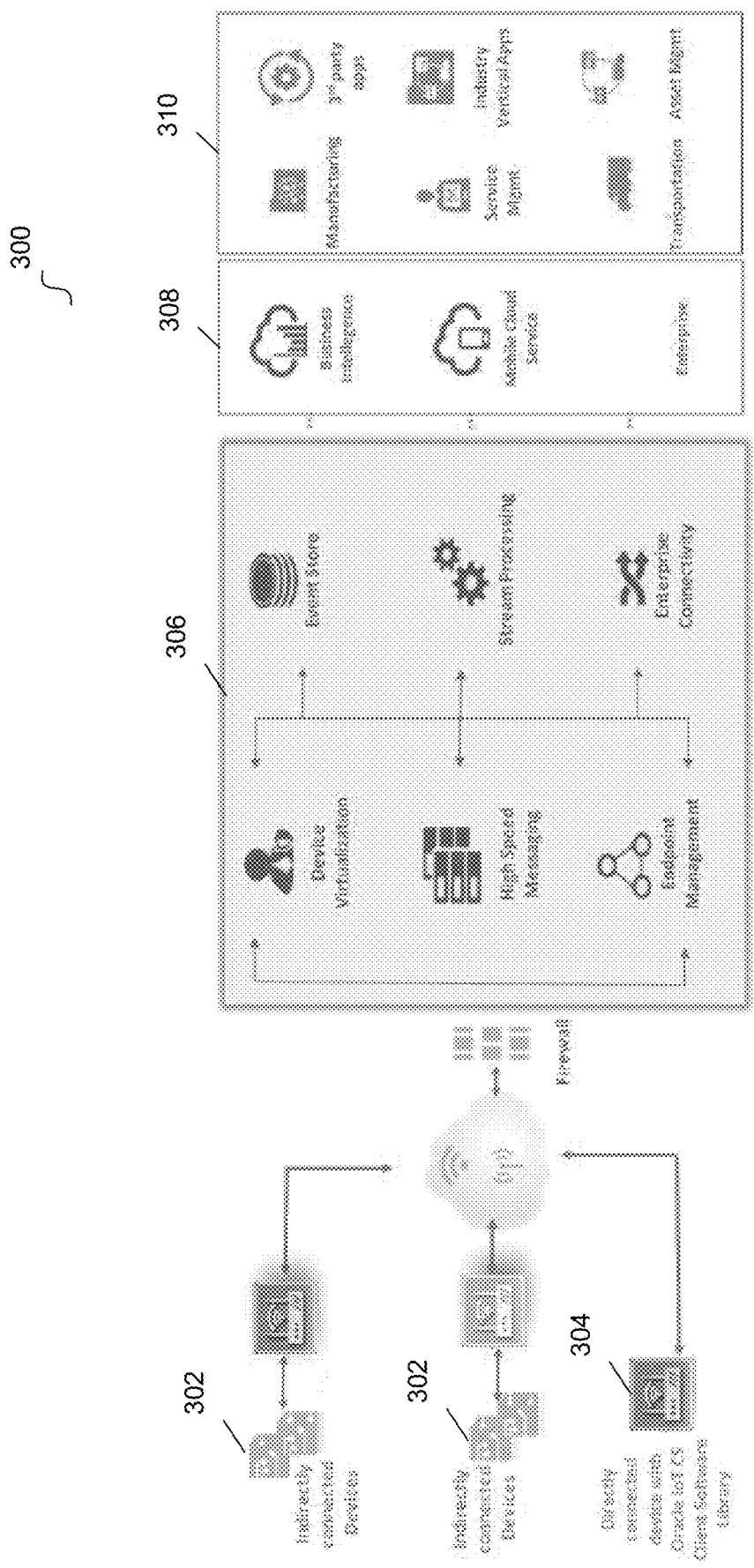
FIG. 3 illustrates a system for communicating with IoT connected devices according to an example embodiment.

FIG. 3 is a system for communicating with IoT connected devices according to an example embodiment. As shown in FIG. 3, system 300 includes indirectly connected devices 302, directly connected devices 304, IoT cloud service 306, cloud service 308, and enterprise applications 310. In some embodiments, directly connected devices 304 can be electronic devices that include IoT client software (e.g., Oracle® IoT Client Software Library) for communicating with IoT cloud services 306. Indirectly connected devices 302 can communicate with IoT cloud service 306 using one or more access points, such as a gateway device that includes IoT client software (e.g., Oracle® IoT Cloud Server Gateway software or Oracle® IoT Cloud Server Client Software Library).

In various embodiments, connected devices can be considered the "things" in the Internet of Things that transmit data to a cloud server. Analytics can then be used to filter and analyze data transmitted from the connected devices. In some implementations, built-in or custom enterprise applications can be integrated such that data can be passed along for further processing. The enterprise applications can transmit reply data (e.g., custom messages or actions) to one or more of the connected devices. For example, the reply from the applications can instruct the connected devices to perform certain tasks or transmit additional data.

Indirectly connected devices 302 and/or connected devices 304 can be any mobile phone, smartphone, tablet, or any suitable electronic device that communicates using wired or wireless communication protocols (e.g., by transmitting and/or receiving wired signals using a connection port or wireless signals with an antenna or transceiver). For example, indirectly connected devices 302 and/or connected devices 304 can be any IoT electronic device that can connect to the Internet.

In some embodiments, indirectly connected devices 302 and/or connected devices 304 can communicate with other electronic devices or wireless access points using a variety of protocols, such as Internet Protocol v. 6 ("IPv6"), Transfer Control Protocol ("TCP"), User Datagram Protocol ("UDP"), Datagram Transport Layer Security ("DTLS"), Java Message Service ("JMS"), Hypertext Transfer Protocol ("HTTP"), RESTful HTTP ("REST"), code division multiple access ("CDMA"), global system for mobile communication ("GSM"), long term evolution ("LTE"), Wi-Fi, Wireless Area Network ("WAN") protocols, Low Power Wide Area ("LPWA") protocols, LoRaWAN, Bluetooth®, Zigbee, Near-Field Communication ("NFC"), or any other suitable wired or wireless protocol.

Further, indirectly connected devices 302 and/or connected devices 304 can communicate using one or more IoT communication protocols, such as an IPSO Smart Objects protocol stack, an Oracle® Internet of Things Cloud protocol stack, or any other suitable IoT protocol. In some examples, indirectly connected devices 302 and connected devices 304 can access wired or wireless communication networks, such as the Internet, by communicating with a network connected access point, such as a base station, access node, wired or wireless router, or any other suitable access point. In some embodiments, indirectly connected devices 302 and/or connected devices 304 may support a variety of applications, such as an Internet browser, messaging applications, device management applications, other various IoT applications, and any other suitable application.

IoT cloud service 306 can provide various cloud services to IoT connected devices, such as Oracle® IoT Cloud Service. Examples of cloud services available can include device virtualization, high speed messaging, endpoint (e.g., device) management, event store, stream processing, enterprise connectivity, and any other suitable IoT cloud service. Device virtualization can abstract IoT devices as a programming object with read/write data properties and message formats. High speed messaging at IoT cloud service 306 can provide reliable protocol independence and bidirectional communication among IoT devices in a network, the IoT cloud service 306, cloud service 308, enterprise applications 310, and any other back-end or service otherwise connected to IoT cloud service 306.

Endpoint management can securely manage devices in an IoT network, deploy software to those devices, and manage security policy for those devices. In various embodiments, an endpoint can be a gateway, a programmable device, a device software running IoT cloud service 306 software (e.g., an Oracle® IoT Cloud Service Gateway device), an adapter, or an enterprise application, for example. Event store can store messages and other data for IoT network devices (e.g., indirectly connected devices 302 and/or connected devices 304). For example, messages sent to and from the IoT devices can be stored in a database. Enterprise connectivity can provide a secure communication channel for communication with enterprise applications, and for the enterprise applications to push or pull messages from IoT cloud service 306. IoT device data and alerts that are sent to IoT cloud service 306 can be analyzed by integrating an IoT application with one or more enterprise applications.

Referring back to FIG. 1, in some embodiments, a software application of enterprise system 116 can provide enterprise planning functionality. For example, a multi-dimensional data model can be implemented to provide a robust, flexible, and efficient framework for generating one or more plans for the enterprise business. A multi-dimensional data model can be represented by a cube, where each side of the cube represents different dimensions of data (e.g., measures, product, plan, calendar, channel, and the like). An example measures dimension can include measures members of an enterprise, such as revenue, profit, expenses, inventory, sales, and the like, where each can further include child measures members (e.g., child members). An example plan dimension can include plan members that represent various plans for the enterprise, such as working plan, previous plan, current plan, and the like. As previously discussed, an example channel dimension can include members that represent channels for performing part of a customer transaction, such as in-store, direct to consumer, third party, and the like.

Some embodiments include a hierarchical multi-dimensional data model, where members of a dimension further have child members. For example, a product member of the product dimension can include child members, such as a product line that features a variety of products within the product line. In this example, the product line member can be considered a parent member and the variety product members within the product line can be considered child members of the parent member. In some embodiments, the member hierarchy can include a number of levels, such a three (e.g., grandparent, parent, child), four, or many more.

In some embodiments, cross-sections of data can be retrieved as part of the generating and/or displaying of enterprise planning data. For example, selections can be received for cross-sections of the multi-dimensional data that involve the display of various combinations or intersections of data elements. An example cross-section of data can include a combination of a given plan (e.g., specific members of the plan dimension), product (e.g., specific members of the product dimension), and measures (e.g., specific members of the measures dimension).

In some embodiments, an intersection represents a specific combination of dimensions/members of data. For example, inventory data for a specific sweater within a specific product line can be represented by an intersection of the inventory dimension and the specific sweater member (e.g., under the specific product line member of the product dimension). Workbooks and/or worksheets, as further described herein, can display data elements that represent specific intersections of data. In some embodiments, a cross-section of data includes a plurality of intersections of data defined by the specific dimensions/members participating in the cross-section.

In some embodiments, a user of the planning software can accomplish multiple planning tasks using workbooks/worksheets. In an example, a workbook can be a user-defined data subset (e.g., from a database storing the enterprise data), or one or more cross-sections of data, that includes selected dimensions (e.g., dimensions and/or specific dimension members). These workbooks can include views and graphical charts used for planning, viewing, and analyzing enterprise data. Workbooks can organize related planning information and divide levels of user responsibility. This framework can allow a user to easily view, create, modify, and store data sets that are common to repeated tasks.

An example structure can include of the following elements: product levels and members such as a department, class, and sub-class for the men's sweater department; calendar levels and members such as half, month, and week for the Spring 2010 season; channel levels and members that may reflect multiple channels within an organization at their aggregate level, such as total in-store divisions, catalog, or e-Commerce (e.g., direct to consumer); plan versions such as Working Plan ("Wp"), Original Plan ("Op"), Current Plan ("Cp"), and Last Year ("Ly"); measures and corresponding business rules such as sales, receipts, inventory.

In some embodiments, workbooks can be built automatically, through a batch process, or manually using a software wizard. Workbooks can contain the planning views, measures, and business rules used for a comprehensive plan. Data in a workbook can be displayed using both multidimensional spreadsheets and charts. The data can be viewed at a detailed level or at an aggregate level. The user interfaces illustrated in FIGS. 4, 5A, 5B, and 5C can be part of an example workbook.

In some embodiments, planning worksheets can be multidimensional, extensible, and dynamic spreadsheets that provide users with views of the data contained in a workbook. Oracle® Retail Predictive Planning can include built-in worksheets that support an industry standard business process. Each worksheet can contain its own unique product, calendar, and metric information. This approach enables users across an organization to use a standard planning process. In some embodiments, worksheets can be customized for each user. Rotating, pivoting, and format functions allow a user to create individual views within a worksheet. Each user may also display the data in a graphical format by using a charting function. The user interfaces illustrated in FIGS. 4, 5A, 5B, and 5C example worksheets.

In some embodiments, planning can be separated into two subprocesses: preseason and in-season planning. Creating a plan, such as a merchandising plan, can occur during preseason planning, while managing and updating the plan can occur during in-season planning. For example, preseason planning can focus on creating an original plan against which to benchmark in-season progress. In a preseason process, a plan can be initialized by seeding enterprise data (e.g., from a previous year or based on a previous year with adjustments). This seeding can give users a curve of demand against which to spread their new plan. Users can then plan sales, receipts, inventory, turn, and gross margin measures, among others.

In some embodiments, users may edit data at many levels of each dimension/member hierarchy (product, location, calendar). If the data is modified at an aggregate level (a level with one or more lower levels beneath it), the modifications can be distributed to the lower levels within the hierarchy, a process known as spreading. If data is modified at a level that has a higher level above it (parent), the data changes can be reflected in those higher levels, a process known as aggregating. Measures can be assigned a default aggregation and spreading behavior. A measure's aggregation method can determine how data is calculated at aggregate levels of the hierarchy, such as month or department. A measure's spread method can determine how data is spread to lower levels of a hierarchy when the user enters data at an aggregate level. Below are example techniques for spreading and aggregating data:

| Aggregation (Agg) Methods | Result | Types of Measures |
|---|---|---|
| Total | Values are summed up the hierarchy dimensions. | Value or unit measures such as sales and receipts. |
| Recalc | Value is recalculated at aggregate levels based on its rule calculation. | Percentage measures such as Gross Margin %. Also other calculated measures such as TO and Forward Cover. |
| PST—Period Start Total | Value is summed up non-calendar dimensions. Value at aggregate time equals the same value as the first child period's value belonging to the aggregate parent. | Beginning of Period Inventory (BOP). |
| PET—Period End Total | Value is summed up non-calendar dimensions. Value at aggregate time equals the same value as the last child period's value belonging to the aggregate parent. | End of Period Inventory (EOP). |
| AMBG | All values within and across hierarchies are equal; otherwise a ? is displayed at aggregate levels. | Used by informational text measures, such as Event Information or pick list Approve/Reject. |
| B_AND | For Boolean types only referring to situations that are either true or false. Value is on or true at an aggregate level if all values within a hierarchy level are on. | Boolean (check box) Submit. |

| Spread Methods | Result | Types of Measures |
|---|---|---|
| Proportional | Typically used in conjunction with Total Agg Type. Value is spread proportionally to the child levels when a value is entered at an aggregate level. | Value or unit measures such as sales and receipts. |

| Spread Methods | Result | Types of Measures |
| --- | --- | --- |
| None | The result of the edit is passed to another measure. The spread method for the measure that inherits the edit is used to spread the new value to the child levels. For example, an edit to Wp Sales var Ly R % at an aggregate level (Month) results first in the Sales R value being recalculated at the Month level, reflecting the edited percent increase over Ly Sales R; then the new Sales R value is spread to the week level proportionally. Finally, the Wp Sales var to LY R % is recalculated at the week level. | Variance measures such as Wp Sales var to Ly R %, Wp Mkd var to Op R %. |
| PS (Period Start) | For edits at an aggregate level, the edited value is placed into the first logical child level beneath the level of the edit. For example, an edit to BOP Inv at the Month level spreads the edited BOP Inv value to the first week reporting to the Month. | |
| PE (Period End) | For edits at an aggregate level, the edited value is placed into the last logical child level beneath the level of the edit. For example, an edit to EOP Inv at the Month level spreads the edited EOP Inv value to the last week reporting to the Month. | Typically used in conjunction with EOP Inv, Avg Inv. |

In some embodiments, seeding can populate certain plan data elements with a previous year's data or a previous year's adjusted data. Any other suitable data population or seeding process can be performed. In some embodiments, edits can be made to plan data, such as to a seeded measure, and the edits can be spread/aggregated to other hierarchy members based on the data that has already been seeded.

In some embodiments, when a customer transaction includes a mix of channels, as previously described, the transaction can have a multi-faceted impact on the enterprise/plan data. For example, for a purchase using an in-store channel, traditional planning software may use the transaction to update sales data, inventory data, fulfilment data, and the like. However, as customer behavior begins to rely on multiple channels for a transaction, the manner in which plan data is impacted by a transaction has changed.

For example, a purchase in-store may impact sales data (e.g., sales team gets credit for the sale) relative to the in-store channel, however may not impact in-store inventory if the customer decides to select a direct to consumer delivery option. In this example, the inventory and fulfilment measures of the direct to consumer channel are impacted by the transaction. In another example, a product previously purchased online (e.g., using the direct to consumer channel) may be returned in-store. Accordingly, the inventory of the in-store channel may be impacted, while the return is associated with the online (direct to consumer) sales transaction.

With planning software that can generate sophisticated cross-sections of multi-dimensional data, as disclosed herein, such a multi-dimensional impact per transaction demands sophisticated software techniques to propagate the impact of multi-channel transactions through the cross-sections of data. In some embodiments, a user interface can be configured to receive input (e.g., metrics) for propagating adjustments to enterprise/planning data.

Figure 4:
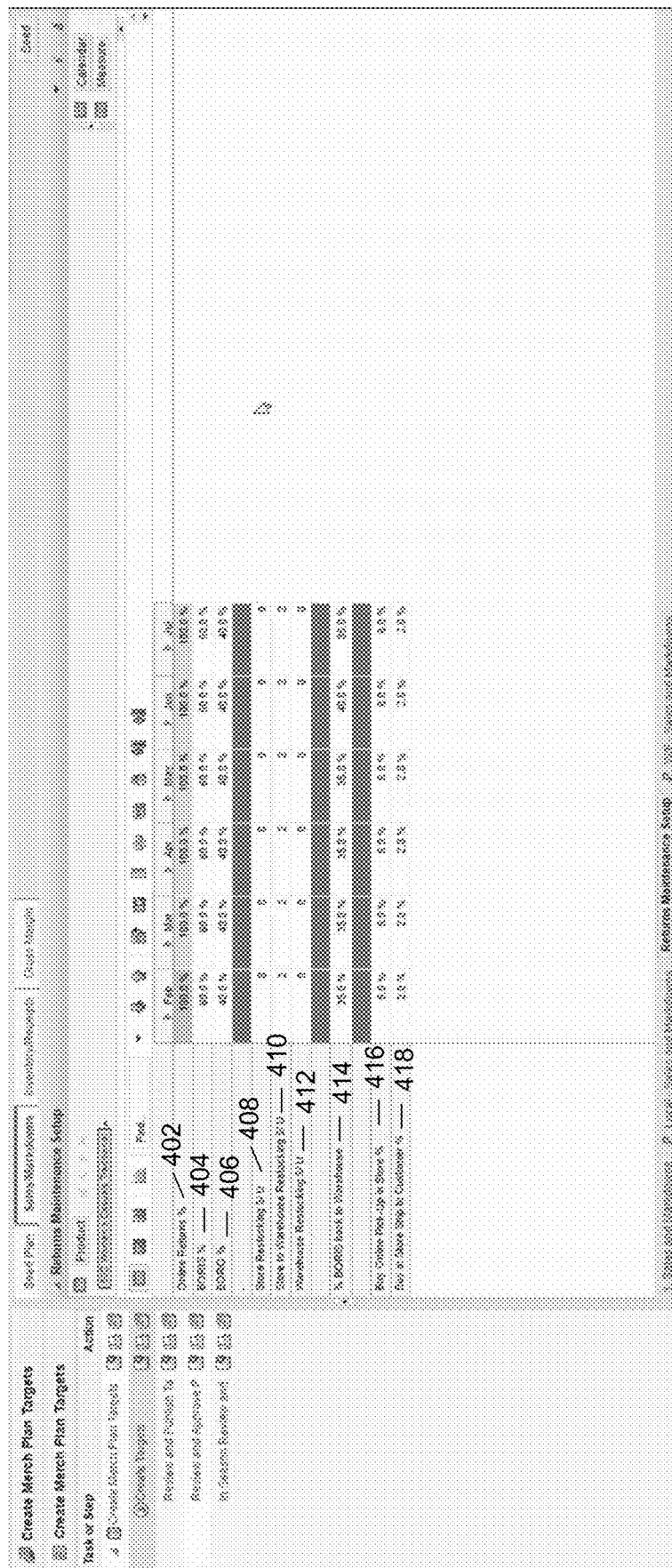
FIG. 4 illustrates a user interface for configuring multi-dimensional data cross-sections over a plurality of channels according to an example embodiment.

FIG. 4 illustrates a user interface for configuring multi-dimensional data cross-sections over a plurality of channels according to an example embodiment. For example, user interface 400 can be configured to receive inputs of data to be propagated through cross-sections of the multi-dimensional data. In some embodiments, user interface 400 is used to configure a workbook (e.g., one or more worksheets).

As illustrated, data values for the metrics displayed in user interface 400 can be broken down into periods of time (e.g., months). Any other suitable period of time can be implemented. In some embodiments, any of the data values for metrics 402, 404, 406, 408, 410, 412, 414, 416, and 418 are editable. In other words, a user can input or change the data values for these metrics (in one or more of the time periods) by interacting with user interface 400. In some embodiments, data values for metrics 402, 404, 406, 408, 410, 412, 414, 416, and 418 can be pulled for production data values (e.g., observed values), for example when interface 400 displays data for in-season planning.

Metric 402 can be a percentage of online returns. In some embodiments, metric 402 is predetermined to equal 100% (e.g., based on the summation of the values of metrics 404 and 406). Metric 404 can be a percentage of products bought online and returned in-store and metric 406 can be a percentage of products bought online and returned online. In some embodiments, functionality of user interface 400 can include a value validation that ensures the values of metric 404 and 406 sum to 100% for any given time period (e.g., month).

As disclosed herein, metric 404 represents mixed channel transactions, where the transactions impact sales for the direct to consumer channel (e.g., online) and inventory for the in-store channel. In addition, metric 414 can be a percentage of products bought online and returned in-store that were also transferred back to a warehouse (e.g., from the store where the product was returned). Metric 414 further illustrates the mixed impact of bought online and returned in store products, as some of these products are not kept as in-store inventory, but rather returned to a warehouse (e.g., fulfilment warehouse, for example for direct to consumer fulfilment) for supplemental distribution/management. Returned products can be shipped back to a warehouse in order to ensure product variety at a store and reduce over-supply.

Metrics 408, 410, and 412 further account for the stocking costs associated with a return. Metric 408 can be the restocking cost at a store, metric 410 can be the restocking cost for shipping the product from the store to a warehouse (e.g., online fulfilment warehouse), and metric 412 can be the restocking cost at the warehouse.

Metric 416 can be a percentage of products bought online and picked up in-store. Metric 416 also represents mixed channel transactions, where the transactions impact sales for the direct to consumer (e.g., online) channel and inventory for the in-store channel. Metric 418 can be a percentage of products bought in-store and shipped directly to the consumer. Metric 418 also represents mixed channel transactions, where the transactions impact sales for the in-store channel and inventory for the direct to consumer channel.

In some embodiments, the metrics illustrated in FIG. 4 are associated with a specified level of the product dimension (e.g., a specific member in the hierarchy of the product dimension). For example, the product member can be a specific variety (e.g., specific brand and/or product line) of women's sweater, and the metrics illustrated in FIG. 4 can be associated with this specific product. As previously described, these metrics are then propagated to different cross-section of dimensions/members, in particular different cross-sections that involve the specific product member. For example, the various cross-sections that can be propagated adjustments include the specific product member and one or more channel members (e.g., direct to consumer, in-store, and the like), one or more inventory members (e.g., in-store inventory, fulfilment warehouse inventory, and the like), a combination of these, and any other suitable dimensions/members.

Figure 5B:
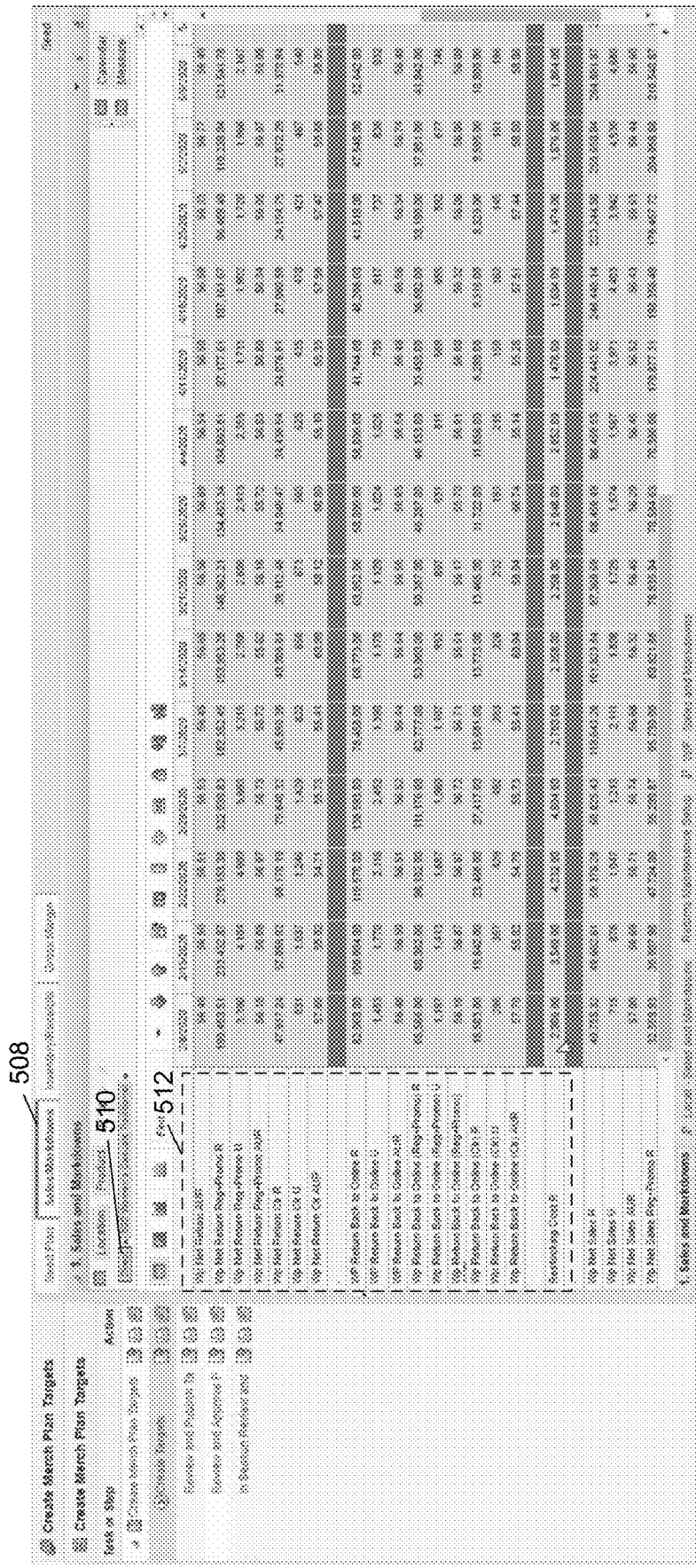

While metrics 402, 404, 406, 408, 410, 412, 414, 416, and 418 are illustrated in FIG. 4, other suitable metrics, such as metrics based on transactions with mixed channel impact, can be implemented. For example, one or more of the below metrics can be implemented by a user interface similar to user interface 400:

FIGS. 5A-5C illustrate user interfaces for configuring and displaying multi-dimensional data cross-sections over a plurality of channels according to an example embodiment. For example, interface 400 of FIG. 4 can configure the data displayed in user interfaces 500A, 500B, and 500C. User interface 500A illustrates a Sales and Markdowns worksheet, as illustrated by interface element 502, that displays sales enterprise data and markdown enterprise data for the in-store (e.g., "Brick and Mortar") channel, as illustrated by interface element 504.

Data elements 506 are example intersections of dimensions/members (e.g., intersections within a cross-section of the multidimensional data) that represent Sales and Markdowns information for a given product, such as returns, restocking cost, and the like. For example, the worksheet depicted in user interface 500A can be configured to display a cross-section of a specific product member (e.g., within the product line member of the product dimension), a specific time period (e.g., of the calendar dimension), a specific plan (e.g., of the plan dimension), specific measures (e.g., of the measures dimension), and a specific channel member (e.g., of the channel dimension), such as the in-store channel, and the like. Data elements 506 can represent a plurality of intersections of these dimensions/members. While a sample set of intersections are depicted, data elements 506 can include many more intersections. For example, one or more of data elements 506 can represent in-store returns of the specific product member over the specific time period, where the returns refer to the specific products purchased in-store.

In some embodiments, one or more of data elements 506 can represent online (e.g., direct to consumer channel) returns of the specific product member over the specific time period, where the returns refer to the specific products purchased in-store. As previously disclosed, these data elements represent mixed channel transactions that impact both

| | | |
|---|---|---|
| Pickup In Store R | Direct Channel: (Sales R * BOPIS %) * −1<br>In-store: Sales R (of Direct Channel) * BOPIS | Buy Online Pickup in Store % (BOPIS %) |
| Ship to Customer R | Direct Channel: Sales R (of B&M Channel) * BSSC<br>In-store: (Sales R * BSSC) * −1 | Buy in Store Ship to Customer % (BSSC %) |
| Buy Online Return In Store R (BORIS R) | Round(Return R (of Direct Channel)/BORO %) − Return R (of Direct Channel) | Buy Online Return Online % (BORO %) |
| Return Back to Online R | Direct Channel: BORIS R * % BORIS back to Warehouse<br>In-store: (BORIS Return R * % BORIS back to Warehouse) * −1 | |
| Restocking Cost R | Direct Channel: (Return U * Warehouse Restocking $/U) + (Return Back to Online U * Store to Warehouse Restocking $/U)<br>In-store: (Return U + Return Back to Online U) * Store to Warehouse Restocking $/U | |
| EOP | BOP Reg + Promo R + Receipts R − Net Sales | *Layered metric that includes other mixed channel metric |
| Reg + Promo R | Reg + Promo R − Mkd Reg + Promo R − Shrink R − Misc Adj R − Move to Clr R + Inv Adj R − Pick Up in Store Reg + Promo R − Ship to Customer Reg + Promo R | |
| Net Return R | Return R + Return Back to Online R | *Layered metric that includes other mixed channel metric |
| Net GM R exc VAT | GM R exc VAT + Vendor Funds R + Royalties − Restocking Cost R − MOS R/(1 + VAT %) − Mkd Due to W/F/(1 + VAT %) | *Layered metric that includes other mixed channel metric | the in-store channel and the direct to consumer channel. User interface 500A illustrates how sales of the in-store channel can be impacted by returns performed using the direct to consumer channel, which is further described herein.

User interface 500B illustrates a Sales and Markdowns worksheet that displays sales enterprise data and markdown enterprise data for the direct to consumer (e.g., "Direct") channel, as illustrated by interface elements 508 and 510. Similar to data elements 506 of user interface 500A, data elements 512 can represents a plurality of intersections of dimensions/members, however the channel member depicted in the interface can be the direct to consumer channel rather than the in-store channel. While a sample set of intersections are depicted, data elements 512 can include many more intersections. For example, one or more of data elements 512 can represent direct to consumer (e.g., online) returns of the specific product member over the specific time period, where the returns refer to the specific products purchased using the in-store channel.

In some embodiments, one or more of data elements 512 can represent in-store returns of the specific product member over the specific time period, where the returns refer to the specific products purchased using the direct to consumer channel (e.g., online). As previously disclosed, these data elements represent mixed channel transactions that impact both the in-store channel and the direct to consumer channel. User interface 500B illustrates how sales of the direct to consumer channel can be impacted by returns performed using the in-store channel, which is further described herein.

User interface 500C illustrates an Inventory and Receipts worksheet that displays sales enterprise data and markdown enterprise data for the in-store (e.g., "Brick and Mortar") channel, as illustrated by interface elements 514 and 516. Similar to data elements 506 and 512 of user interface 500A and 500B, data elements 518 can represents a plurality of intersections of dimensions/members, the channel member depicted in the interface can be the direct to consumer channel rather than the in-store channel, and the measure members can relate to sales and receipts. While a sample set of intersections are depicted, data elements 518 can include many more intersections. As previously disclosed, data elements 518 can also include intersections that represent mixed channel transactions that impact both the in-store channel and the direct to consumer channel.

The intersections (e.g., of dimensions/members) depicted by user interfaces 500A, 500B, and 500C are merely examples, and any other suitable intersections can be implemented. In some embodiments, it can be determined that a portion of intersections are subject to adjustment, for example based on the dimensions/members participating in a particular cross-section of data. For example, mixed channel transactions can include selective rule base adjustments propagated through various dimensions, such as when inventory data for a cross-section involving an in-store channel dimension is adjusted based on a return transaction from a direct to consumer channel sale.

In some embodiments, a given cross-section may include a given product (e.g., of a product line member of the product dimension), a plurality of measures (e.g., inventory, sales, and the like), and one or more channel members (e.g., in-store and/or direct to consumer). In some embodiments, it may be determined whether the given product includes mixed channel transactions (as previously described). In addition, it may be determined whether one or more of the plurality of measures is impacted by the mixed channel transactions (e.g., inventory or sales).

In some embodiments, when it is determined that the given product includes mixed channel transactions and one or more measures include measures impacted by mixed channel transactions, an interface similar to interface 400 of FIG. 4 can be generated to receive metrics used to compensate for the multidimensional impact. In other embodiments, the metrics can be derived from observed transactions (e.g., transactions of mixed channel impact observed over a period of time). Using these metrics, rules can selectively perform intersection specific adjustments for specific intersections (e.g., data values) of the cross-section of selected dimensions/members.

In some embodiments, the received metrics can be similar to the metrics previously disclosed with reference to FIG. 4 (e.g., Pickup in Store R, Ship to Customer R, Buy Online Return in Store R (BORIS R), Return Back to Online R, Restocking Cost R, EOP Reg+Promo R, Net Return R). In an example, an intersection specific adjustment can be performed on an intersection that represents in-store inventory for a given product. For example, a default inventory data value for the given product does not account for transactions where the given product is bought online (e.g., direct to consumer) and returned in-store, thus adding to in-store inventory. Accordingly, the metric that defines the number of transactions where the given product was bought online and returned in-store can be used to perform an intersection specific adjustment to the intersection that represents the in-store inventory for the given product.

In some embodiments, a plurality of adjustments can be made to a specific intersection based on the rules and the plurality of metrics. For example, the in-store inventory for the given product can also be adjusted based on the number of the given products that are bought online, returned in-store, and transferred back to the warehouse (e.g., fulfillment warehouse), as these products no longer add to the in-store inventory. A number of additional intersection specific adjustments can be performed based on similarly defined rules according to received metrics (e.g., received from a user or observed).

In some embodiments, a user can set targets or a planner can create a plan that uses the metrics to calculate an impact (e.g., inventory, sales, and the like) on each channel based on the rules. The following define example rules for performing mixed channel adjustments using received or observed metrics:

Pickup in store is calculated as the % of online sales which are picked-up in store. This is made negative for the online channel (to add back the sales that will not be fulfilled from the online channel) and positive for the in-store channel (to deduct additional stock that will fulfill an online sale).

Buy online return to store is calculated as the % of online returns that are returned in store. This is made negative for the online channel (to add the number of returns that will not be received at the direct warehouse channel back and decreasing the total number of returns at the direct warehouse channel) and positive for the in-store channel (to include the additional number of returns that will be received at the in-store channel from online/direct channel sales, increasing the total number of returns at the in-store channel).

Ship to customer is calculated as the % of store (in-store) sales which are shipped to the customer (from an Online or direct to consumer channel). This is made negative for the in-store channel (to add back the sales that will not be fulfilled from the in-store channel) and positive for the direct to consumer channel (to deduct additional stock that will fulfill the in-store sale).

End of Period ("EOP") inventory can deduct "Pick up in Store" and "Ship to Customer".

Net returns can add "Returns back to Online" (a negative number for an in-store channel, a positive value for a direct to consumer channel).

Restocking costs can be deducted from net gross margin.

When the functionality of the disclosed embodiments is performed, the data retrieved for a cross-section of multi-dimensional data can be considered to form a dynamic data structure, where the dynamic functionality of the data structure is defined by rules which are triggered based on the presence of participating dimensions/members. For example, when it is determined that mixed channel transactions impact the selected cross-section of dimensions/members, the data retrieved for the cross-section can be shaped using tailored rules and specific metrics that selectively adjust data values within the data structure to more accurately represent the cross-section of data (e.g., measure, such as inventory or sales, of a specific product). The combination of functionalities that achieve this dynamic data structure results in improvements to the flexibility, accuracy, and robustness of the planning software.

In some embodiments, by performing the disclosed cross-channel adjustments to the multi-dimensional enterprise data, the planning functionality can achieve heightened visibility for projected inventory levels and greater levels of automation, where the software calculates the inventory impacts based on the user-entered (or observed) percentages for mixed channel transactions. In some embodiments, a user/planner can simply plan sales and return rates for their given channel. Based on the disclosed functionality, the planning software can instantly calculate the inventory impact on 'other' channels (for example buy in-store, ship to customer; or buy online return in store).

In some embodiments, the adjustments can be propagated to multiple dimensions of data (e.g., multiple cross-sections involving a specific product member) based on input from a plurality of users. For example, users can have defined roles that are related to metrics used to perform the disclosed adjustments (e.g., metrics illustrated in FIG. 4), such as in a particular planning scenario. In an embodiment, a first user may be assigned a role for inputting the BORIS and/or BORO metrics (e.g., 402 and 404 of FIG. 4) and a second user may be assigned a role for inputting the BOPIS and/or BSSC (e.g., 416 and 418 of FIG. 4).

However, some implementations of planning software rely on batch updates to make changes to the underlying enterprise data. Batch updates often include lag time, sometimes up to 24 hours (e.g., a nightly batch update). In this example, because multiple users can input values that impact a variety of cross-sections of data at different times, there is a risk that a stale or otherwise improper metric (e.g., a stale or improper value for one of 402, 404, 416, and/or 418) is used perform the adjustments. In some embodiments, rather than relying on a batch update, a user interface similar to the one depicted in FIG. 4 can include a refresh component that can be used to update the metric values instantly (e.g., in real-time). In these embodiments, multiple users can rely on the information displayed in the user interface (of FIG. 4) since the batch update is not needed to keep the information fresh.

In some embodiments, the refresh component can also be used to propagate updated adjustment to the underlying enterprise data adjusted by the metrics. In other words, when a new or updated BORIS value is input (by a user that has the relevant defined role), the refresh component can not only update the BORIS value displayed to other users (e.g., underlying BORIS valued saved in the database), but also to update the adjustments performed to the intersections of data adjusted by BORIS as defined by the relevant rule (e.g., intersection of the specific product, inventory, and channel members, or any other suitable intersections). With such an implementation, not only can a user rely on the metrics displayed in the user interface, but also the data adjusted by the metrics, as the refresh component ensures that the user does not need to wait for a batch update to view the updated data. Accordingly, embodiments also provide the ability to define different roles for different users while also ensuring that the actions taken by these different users at different times does not create a data conflict. Further, embodiments ensure that the actions of the different users are reflected in the underlying and displayed data in real-time (e.g., without waiting for a batch process).

Figure 6:
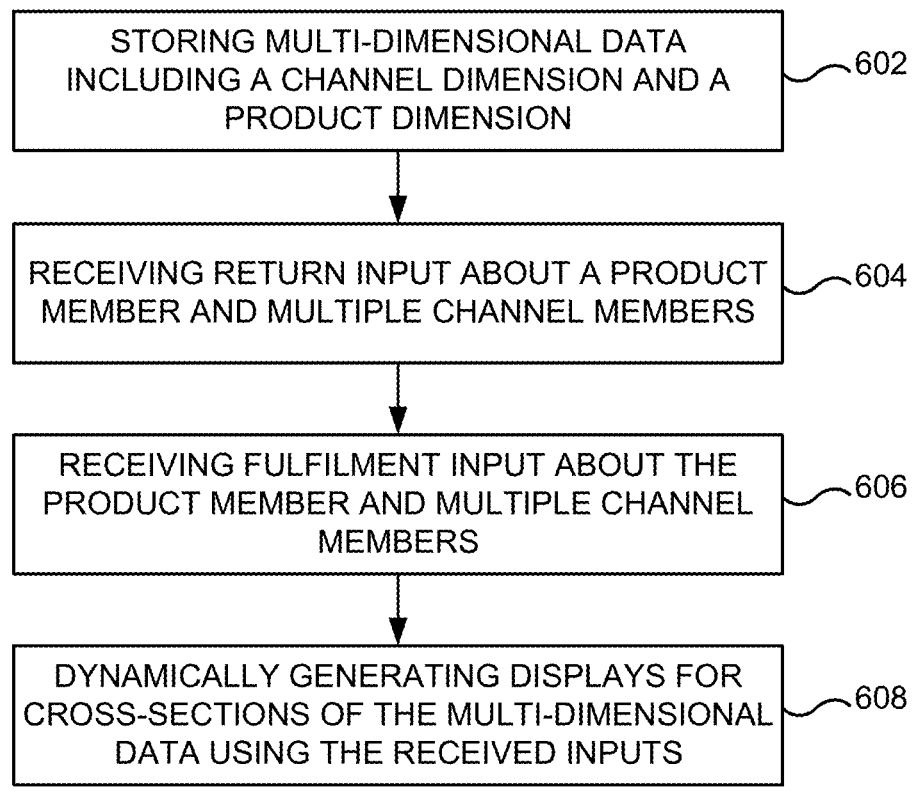
FIG. 6 illustrates a flow chart for to propagating adjustments across channels of multi-dimensional data according to an example embodiment.

FIG. 6 illustrates a flow diagram for propagating adjustments across channels of multi-dimensional data according to an example embodiment. In one embodiment, the functionality of FIGS. 6 and 7 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 6 and 7 can be performed by one or more elements of system 200 of FIG. 2.

At 602, multi-dimensional data is stored in a database, the multi-dimensional data including a plurality of dimensions comprising at least a channel dimension with a plurality of channel members and a product dimension with a plurality of product members. For example, multi-dimensional enterprise data can be stored (e.g., seeded or populated) in a database, as disclosed herein. In some embodiments, the multi-dimensional data can be hierarchical, including a plurality of members in the channel dimension and a plurality of members in the product dimension, one or more of these dimensions including hierarchical members. Other channels and/or members (e.g., hierarchical members) can be implemented in various embodiments.

At 604, return input about a first product member can be received, the return input comprising a first number of products purchased using a first channel member and returned using a second channel member. For example, the return input can be an edited/input data value for one of the metrics illustrated in user interface 400 of FIG. 4, or any other suitable metric.

At 606, fulfilment input about the first product member can be received, the fulfilment input comprising a second number of products bought using one of the plurality of channel members and fulfilled using a different one of the plurality of channel members. For example, the fulfilment input can be an edited/input data value for one of the metrics illustrated in user interface 400 of FIG. 4, or any other suitable metric.

Figure 7:
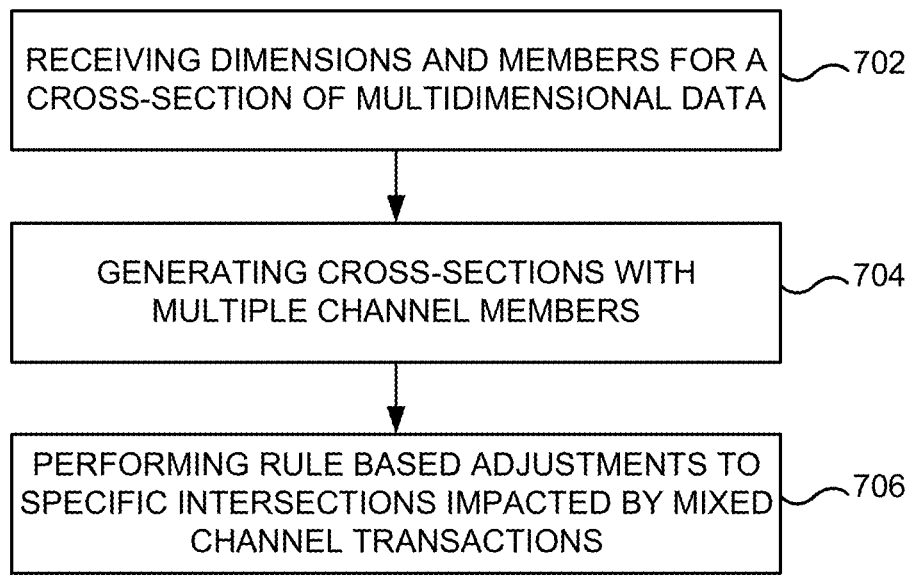
FIG. 7 illustrates a flow chart for propagating adjustments across channels of multi-dimensional data according to an example embodiment.

At 608, one or more displays for cross-sections of data between the first product member and multiple of the plurality of the channel members can be dynamically generated, wherein the first number and second number are propagated to one or more intersections of the first product member and the multiple of the plurality of channel members by dynamically adjusting one or more of inventory data or sales data based on the first number and the second number. FIG. 7 further describes propagation techniques for propagating adjustments through multiple channels of the multi-dimensional data.

FIG. 7 illustrates a flow diagram for propagating adjustments across channels of multi-dimensional data according to an example embodiment. For example, 608 of FIG. 6 can include the functionality of FIG. 7. In embodiments, the functionality of the flow diagram is performed by hardware, software, or a combination of these.

At 702, dimensions and members are received for a cross-section of the multi-dimensional data, including a plurality of dimensions comprising at least a channel dimension with a plurality of channel members and a product dimension with a plurality of product members. At 704, cross-sections of the multidimensional data can be generated based on the received dimensions and members. In some embodiments, a workbook and/or worksheets can be generated that include one or more cross-sections of the stored multi-dimensional data, the cross-sections including at least multiple members of the channel dimension (e.g., in-store and direct to consumer) and the first product member. In some embodiments, a query can be generated based on the received dimensions and members to retrieve the corresponding data from a database (e.g., relational database).

At 706, intersections of the multidimensional data impacted by mixed channel transactions can be selectively adjusted. For example, based on one or more metrics defined for mixed channel transactions, specific intersections of data can be target for adjust. In an example, based on the return input and corresponding first number of products (604 of FIG. 6), and fulfilment input and corresponding second number of products (606 of FIG. 6), inventory data and/or sales data for the one or more cross-sections of data can be adjusted, where the data adjustments are propagated through intersections with the multiple members of channel dimension.

In some embodiments, one or more rules can be defined that perform selective adjustments to intersections of data based on which members/dimensions are participating in the one or more cross-sections. For example, an intersection of the first product member, one of the channel members, and a measure member, such as inventory, can be selectively adjusted based on a first number of products purchased using a first channel member and returned using a second channel member. In another example, an intersection of the first product member, one of the channel members, and a measure member, such as sales, can be selectively adjusted based on a second number of products bought using one of the plurality of channel members and fulfilled using a different one of the plurality of channel members.

In some embodiments, the functionality of the workbooks/worksheets can be used to explore the adjusted values and cross-sections of data. For example, the rules based adjustment can be performed to a specific intersection of data at a first level in a hierarchy, such as when viewing the data from a monthly granularity. The disclosed spreading and/or aggregating functionality can be used to explore this data at different levels of this hierarchy (e.g., when viewing the data from a weekly granularity or a yearly granularity). In these embodiments, the selectively performed adjustments can be reflected at different levels of the hierarchical data using the spreading and aggregating functionalities.

Figure 8:
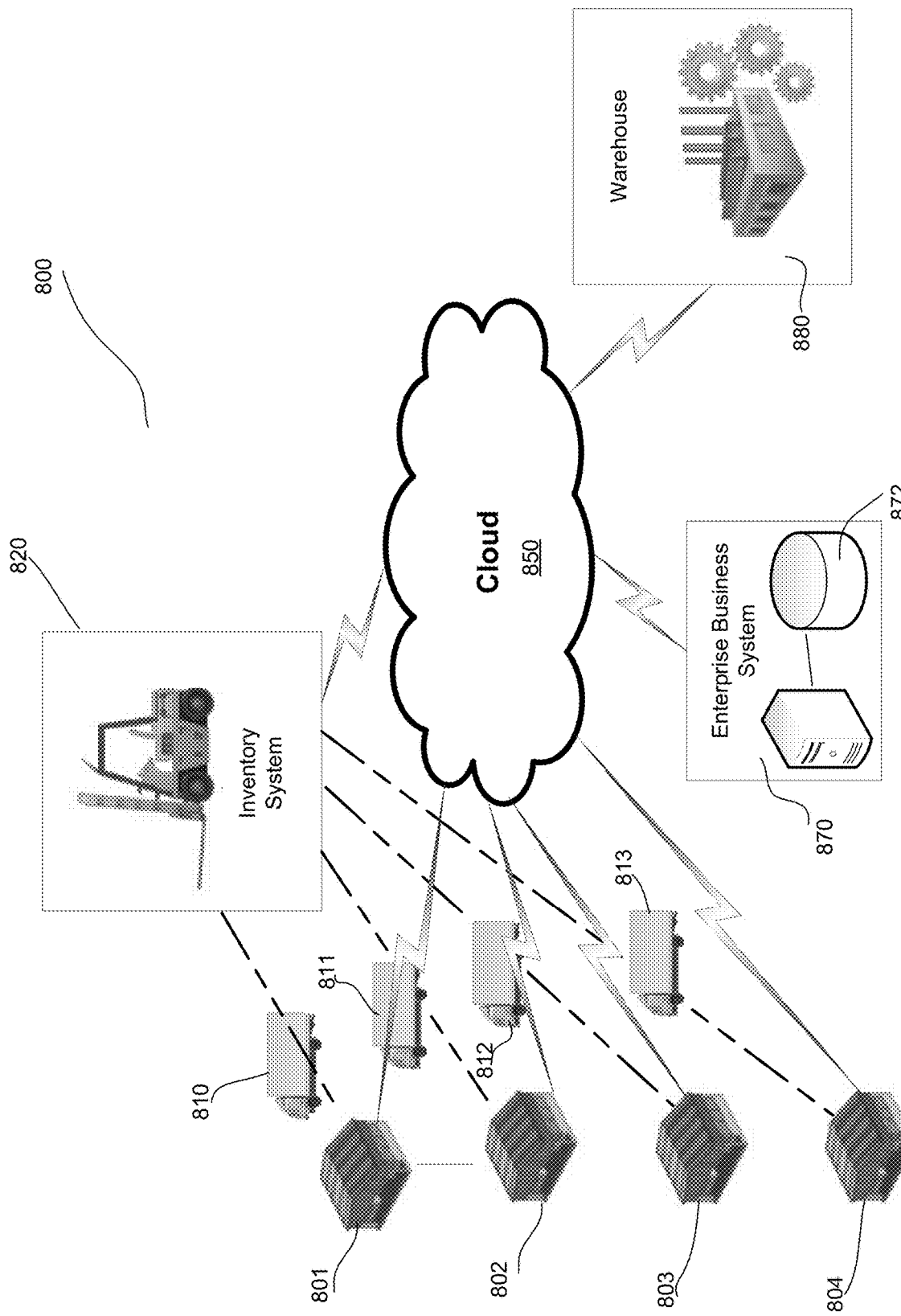
FIG. 8 illustrates an integrated supplier, inventory, and logistics system that includes improved planning and supply actions as disclosed herein according to an example embodiment.

FIG. 8 illustrates an integrated supplier, inventory, and logistics system that includes stock management as disclosed herein according to an example embodiment. As shown in FIG. 8, system 800 can include an enterprise business system 870 that executes code to manage stock of products for enterprise locations 801-804 using warehouse 880, and to ship products from warehouse 880 directly to consumers. Enterprise business system 870 is in communication through a cloud network 850 or other type of communications network with one or more inventory system 820. In some embodiments, planning software of enterprise business system 870 can generate a plan, such as an in-season plan, that provides planned inventory levels for a variety of products. Inventory system 820 and warehouse 880 can execute shipments to and from enterprise locations 801-804 based on these planned inventory levels. In some embodiments, the adjustments propagated through multiple dimensions of a cross-section of enterprise data can provide improvements to these planned inventory levels, thus generating a more efficient shipment process.

Inventory system 820 stores inventory and provides transportation logistics to deliver items to enterprise locations 801-804 and to consumer locations (e.g., consumer homes) using trucks 810-813 or some other transportation mechanisms. Inventory system 820 in one embodiment implements an Enterprise Resource Planning ("ERP") specialized computer system or a specialized inventory control system that uses input from enterprise business system 810, such as an in-season plan generated by planning software, to determine levels of inventories and the amount and timing of the delivery of products to enterprise locations 801-804.

Warehouse 880 can be a fulfilment warehouse that supplies one or more products to enterprise locations 801-804 based on inventory system 820 and that ships products to consumer locations (e.g., consumer homes). Warehouse 880 in one embodiment implements an ERP specialized computer system or a specialized supplier system that uses input from enterprise business system 810, such as an in-season plan generated by planning software, to determine an amount of and timing for product shipments to inventory system 820 and/or enterprise locations 801-804. In some embodiments, for instance based on returns to enterprise locations 801-804, warehouse 880 may receive shipments form enterprise locations, for instance to ensure the enterprise locations are not oversupplied and have sufficient product variety.

Embodiments propagate adjustments across channels of multi-dimensional data. In some embodiments, the adjustments can relate to products and the channels can include various channels for performing product transactions and fulfilling product orders. For example, a customer can purchase a product using an in-store channel, and the purchase can be fulfilled using a direct to consumer (e.g., ship to customer) channel. Other examples include purchase using direct to consumer (e.g., over the Internet) and pick up in-store, purchase using direct to consumer (e.g., online) and return in-store, purchase in-store and direct return (e.g., by mail), and the like.

In some embodiments, software (e.g., planning software and/or inventory system software) can propagate adjustments across the channels of the multi-dimensional data to configure the enterprise data (e.g., plan data and/or inventory data) according to realistic consumer behavior. For example, inventory levels, sales data, and the like can be adjusted to reflect the unique circumstances for product transactions, fulfilments, and returns.

In some embodiments, planning software, such as Oracle® Retail Merchandise Financial Planning, can include a multi-dimensional data model for planning over enterprise data. For example, the multi-dimensional data model can include a channel dimension with channel members, such as direct to consumer, in-store, Internet of Things ("IoT"), catalog, third party, and the like. Other dimensions can include products, plans, calendar, measures (e.g., inventory, sales, and the like), and any other suitable dimensions, as well as corresponding members within these dimensions.

When purchases, fulfilment of purchases, and returns use a different mix of channels as described above, the multi-dimensional data can be impacted in several ways, particularly with regard to different cross-sections of the multi-dimensional data. For example, inventory levels, sales data, and other planning data can be incorrect if adjustment that compensate for the mixed channel purchases, fulfilments, and/or returns are not applied to the enterprise data. In some embodiments, adjustments can be propagated to different levels of the multi-dimensional data to compensate for the underlying enterprise data changes caused by the mixed channel usage. After adjustment, the enterprise data more accurately reflects the circumstances for customer transactions with the enterprise, allowing for improved planning by the planning software.

In some embodiments, shipments can be performed according to adjusted enterprise data. For example, based on certain adjustments to inventory levels, shipments can be executed between a warehouse and a store. When the mixed channel adjustments are executed to enterprise inventory data, the adjusted inventory may more accurately reflect real-world scenarios, and thus supply shipments can be executed in a manner that improves resource utilization.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for propagating adjustments across channels of multi-dimensional data, the method comprising:
    storing multi-dimensional data in a database, the multi-dimensional data including a plurality of dimensions comprising at least a channel dimension with a plurality of channel members and a product dimension, wherein the product dimension comprises a hierarchy of product members comprising at least a parent product line member and a plurality of child product members categorized within the parent product line member;
    receiving return input about a first product member of the child product members, the return input comprising a first number of products purchased using a first channel member of the plurality of channel members and returned using a second channel member of the plurality of channel members;
    receiving fulfilment input about the first product member, the fulfilment input comprising a second number of products bought using one of the plurality of channel members and fulfilled using a different one of the plurality of channel members; and
    dynamically generating one or more displays for one or more cross-sections of data between the first product member and multiple of the plurality of the channel members, wherein the dynamically generating includes selectively propagating the first number of products and second number of products to a set of intersections of the first product member and the multiple of the plurality of channel members based on rules for performing mixed channel adjustments, a first intersection from the set of intersections comprises a first numeric value that represents inventory data or sales data, a second intersection from the set of intersections comprises a second numeric value, and the rules for performing mixed channel adjustments cause the first numeric value to be dynamically adjusted using a first formula comprising the first number of products and the second number of products and cause the second numeric value to be dynamically adjusted using a second formula comprising one or more of first number of products and the second number of products.

2. The method of claim 1, wherein the first channel member comprises a direct to customer channel and the second channel member comprises an in-store channel.

3. The method of claim 2, wherein the second number of products comprises a number of products bought using the direct to customer channel and fulfilled using the in-store channel.

4. The method of claim 3, further comprising:
    receiving input comprising multiple of the plurality of dimensions and multiple members within the plurality of dimensions, the plurality of dimensions comprising at least the channel dimension and the product dimension, and the multiple members comprising at least the first product member, the first channel member, and the second channel member, wherein the dynamically generated one or more displays are generated for cross-sections of data between the plurality of dimensions and multiple members within the dimensions defined by the input, wherein the set of intersections to which the first number of products and the second number of products are selectively propagated comprise intersections of the plurality of dimensions and multiple members within the dimensions.

5. The method of claim 4, wherein the rules for performing mixed channel adjustments comprise rules defined for the return input that selectively target at least one intersection of data such that the data value at the selectively targeted intersection is adjusted using by the first number of products and rules defined for the fulfilment input that selectively target at least one intersection of data such that the data value at the selectively targeted intersection is adjusted using the second number of products.

6. The method of claim 4, wherein dynamically adjusting one or more of inventory data or sales data based on the first number of products and the second number of products comprises increasing an in-store inventory measure by the first number of products and increasing a direct to consumers sales measure by the second number of products.

7. The method of claim 4, further comprising:
receiving input defining an updated first number of products and an updated second number of products; and
dynamically propagating the updated first number of products and the updated second number of products through the intersections of the plurality of dimensions and multiple members within the dimensions, wherein the updated first number of products and the updated second number of products are selectively propagated to the set of intersections based on the rules for performing mixed channel adjustments.

8. A non-transitory computer readable medium having instructions stored thereon that, when executed by a processor, cause the processor to propagate adjustments across channels of multi-dimensional data, wherein, when executed, the instructions cause the processor to:
store multi-dimensional data in a database, the multi-dimensional data including a plurality of dimensions comprising at least a channel dimension with a plurality of channel members and a product dimension, wherein the product dimension comprises a hierarchy of product members comprising at least a parent product line member and a plurality of child product members categorized within the parent product line member;
receive return input about a first product member of the child product members, the return input comprising a first number of products purchased using a first channel member of the plurality of channel members and returned using a second channel member of the plurality of channel members;
receive fulfilment input about the first product member, the fulfilment input comprising a second number of products bought using one of the plurality of channel members and fulfilled using a different one of the plurality of channel members; and
dynamically generate one or more displays for one or more cross-sections of data between the first product member and multiple of the plurality of the channel members, wherein the dynamically generating includes selectively propagating the first number of products and second number of products to a set of intersections of the first product member and the multiple of the plurality of channel members based on rules for performing mixed channel adjustments, a first intersection from the set of intersections comprises a first numeric value that represents inventory data or sales data, a second intersection from the set of intersections comprises a second numeric value, and the rules for performing mixed channel adjustments cause the first numeric value to be dynamically adjusted using a first formula comprising the first number of products and the second number of products and cause the second numeric value to be dynamically adjusted using a second formula comprising one or more of first number of products and the second number of products.

9. The computer readable medium of claim 8, wherein the first channel member comprises a direct to customer channel, the second channel member comprises an in-store channel, and the second number of products comprises a number of products bought using the direct to customer channel and fulfilled using the in-store channel.

10. The computer readable medium of claim 9, wherein the instructions cause the processor to:
receive input comprising multiple of the plurality of dimensions and multiple members within the plurality of dimensions, the plurality of dimensions comprising at least the channel dimension and the product dimension, and the multiple members comprising at least the first product member, the first channel member, and the second channel member, wherein the dynamically generated one or more displays are generated for cross-sections of data between the plurality of dimensions and multiple members within the dimensions defined by the input, wherein the set of intersections to which the first number of products and the second number of products are selectively propagated comprise intersections of the plurality of dimensions and multiple members within the dimensions.

11. The computer readable medium of claim 10, wherein the rules for performing mixed channel adjustments comprise rules for the return input that selectively target at least one intersection of data such that the data value at the selectively targeted intersection is adjusted using the first number of products and rules defined for the fulfilment input that selectively target at least one intersection of data such that the data value at the selectively targeted intersection is adjusted using the second number of products.

12. The computer readable medium of claim 10, wherein the instructions cause the processor to:
receive input defining an updated first number of products and an updated second number of products; and
dynamically propagate the updated first number of products and the updated second number of products through the intersections of the plurality of dimensions and multiple members within the dimensions, wherein the updated first number of products and the updated second number of products are selectively propagated to the set of intersections based on the rules for performing mixed channel adjustments.

13. A system for propagating adjustments across channels of multi-dimensional data, the system comprising:
a processor; and
a memory storing instructions for execution by the processor, the instructions configuring the processor to:
store multi-dimensional data in a database, the multi-dimensional data including a plurality of dimensions comprising at least a channel dimension with a plurality of channel members and a product dimension, wherein the product dimension comprises a hierarchy of product members comprising at least a parent product line member and a plurality of child product members categorized within the parent product line member;
receive return input about a first product member of the child product members, the return input comprising a first number of products purchased using a first channel member of the plurality of channel members and returned using a second channel member of the plurality of channel members;
receive fulfilment input about the first product member, the fulfilment input comprising a second number of products bought using one of the plurality of channel members and fulfilled using a different one of the plurality of channel members; and
dynamically generate one or more displays for one or more cross-sections of data between the first product member and multiple of the plurality of the channel members, wherein the dynamically generating includes selectively propagating the first number of products and second number of products to a set of intersections of the first product member and the multiple of the plurality of channel members based on rules for performing mixed channel adjustments, a first intersection from the set of intersections comprises a first numeric value that represents inventory data or sales data, a second intersection from the set of intersections comprises a second numeric value, and the rules for performing mixed channel adjustments cause the first numeric value to be dynamically adjusted using a first formula comprising the first number of products and the second number of products and cause the second numeric value to be dynamically adjusted using a second formula comprising one or more of first number of products and the second number of products.

14. The system of claim 13, wherein the first channel member comprises a direct to customer channel, the second channel member comprises an in-store channel, and the second number of products comprises a number of products bought using the direct to customer channel and fulfilled using the in-store channel.

15. The system of claim 14, wherein the processor is further configured to:
receive input comprising multiple of the plurality of dimensions and multiple members within the plurality of dimensions, the plurality of dimensions comprising at least the channel dimension and the product dimension, and the multiple members comprising at least the first product member, the first channel member, and the second channel member, wherein the dynamically generated one or more displays are generated for cross-sections of data between the plurality of dimensions and multiple members within the dimensions defined by the input, wherein the set of intersections to which the first number of products and the second number of products are selectively propagated comprise intersections of the plurality of dimensions and multiple members within the dimensions.

16. The system of claim 15, wherein the rules for performing mixed channel adjustments comprise rules defined for the return input that selectively target at least one intersection of data such that the data value at the selectively targeted intersection is adjusted using the first number and rules defined for the fulfilment input that selectively target at least one intersection of data such that the data value at the selectively targeted intersection is adjusted using the second number.

17. The method of claim 1, wherein dynamically generating the one or more displays for one or more cross-sections of data between the first product member and multiple of the plurality of the channel members occurs in real-time with receiving the return input or receiving the fulfillment input.

18. The method of claim 1, wherein the return input or fulfillment input are received at a user interface, the user interface displays a refresh user interface element, and the refresh user interface element is configured to trigger real-time generation of the dynamically generated one or more displays.

19. The method of claim 1, further comprising:
dynamically generating one or more second displays for one or more cross-sections of data between the first product member and multiple of the plurality of channel members after receiving a selection to traverse along a measure dimension participating in the one or more cross-sections of data, wherein the dynamically adjusted first numeric value takes part in a spreading or aggregating functionality based on the traversal along the measure dimension to mathematically generate another numeric value displayed by the one or more second displays.

20. The method of claim 19, wherein spreading functionality comprises spreading the dynamically adjusted first numeric value to multiple lower levels in a hierarchy of the measure dimension to generate the another numeric value based on the traversal along the measure dimension and aggregating functionality comprises mathematically aggregating the adjusted first numeric value with other numeric values of the measure dimension to generate the another numeric value for a higher level in the hierarchy of the measure dimension based on the traversal along the measure dimension.

* * * * *